C. SCHWARTZ.
CLOTH MEASURING AND CUTTING AND COST COMPUTING MACHINE.
APPLICATION FILED JULY 1, 1912.
1,092,802.
Patented Apr. 7, 1914.
4 SHEETS—SHEET 1.
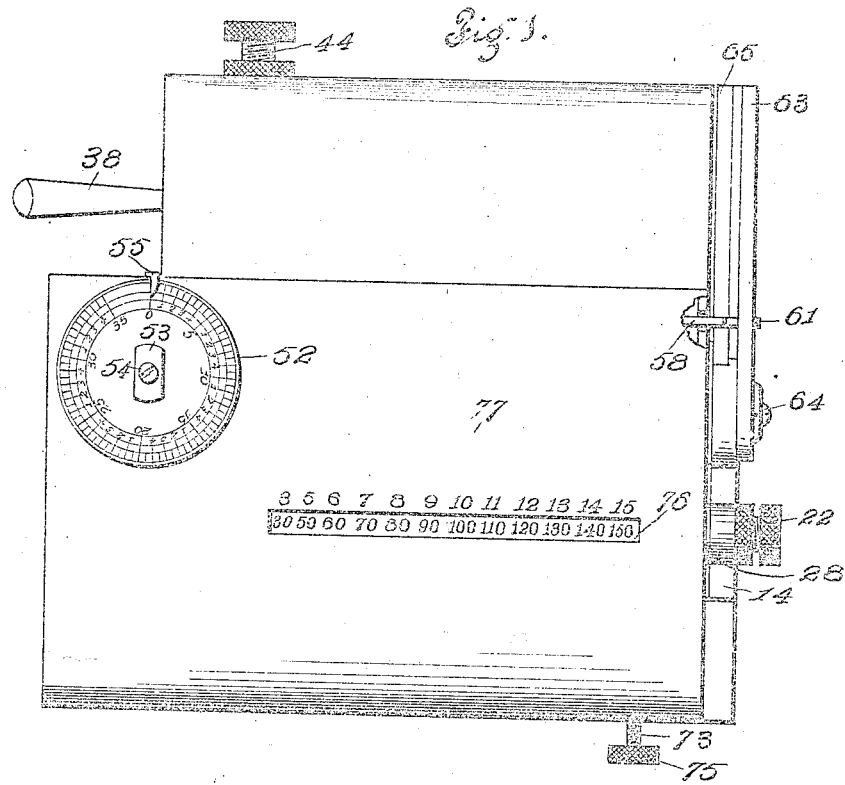
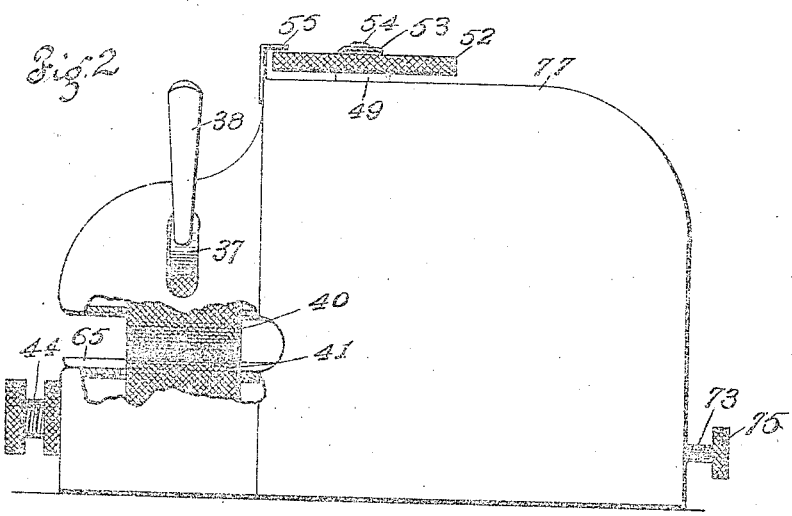
Witnesses
W. C. Stein
M. G. Lindsay.
Inventor
Carl Schwartz
by Alfred A. Kiehl Atty.

C. SCHWARTZ.
CLOTH MEASURING AND CUTTING AND COST COMPUTING MACHINE.
APPLICATION FILED JULY 1, 1912.
1,092,802.
Patented Apr. 7, 1914.
4 SHEETS—SHEET 2.
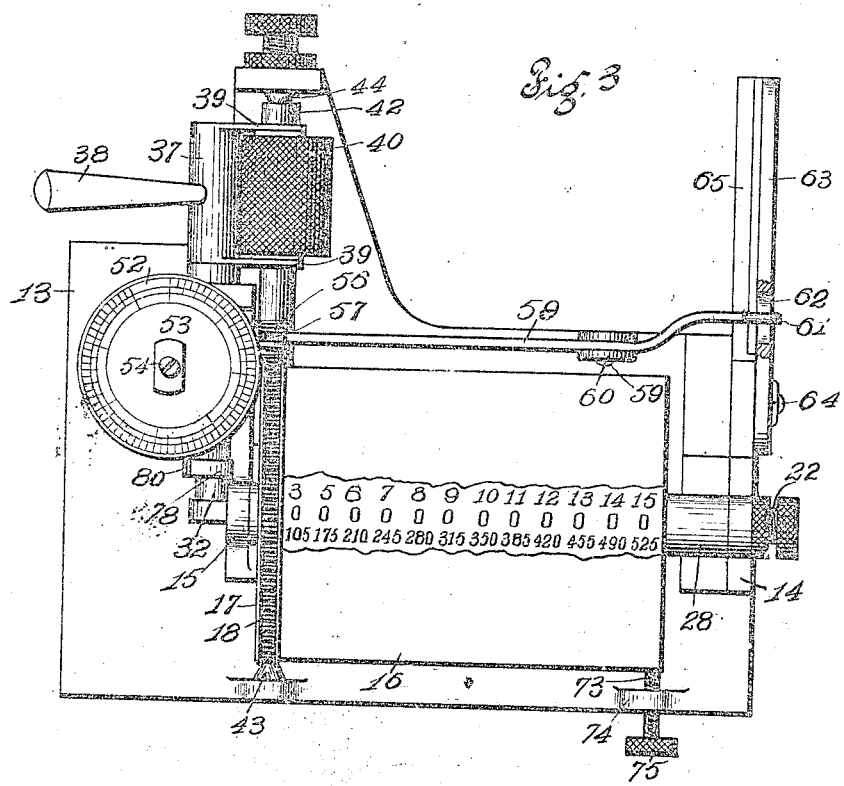

C. SCHWARTZ.
CLOTH MEASURING AND CUTTING AND COST COMPUTING MACHINE.
APPLICATION FILED JULY 1, 1912.
1,092,802.
Patented Apr. 7, 1914.
4 SHEETS—SHEET 3.
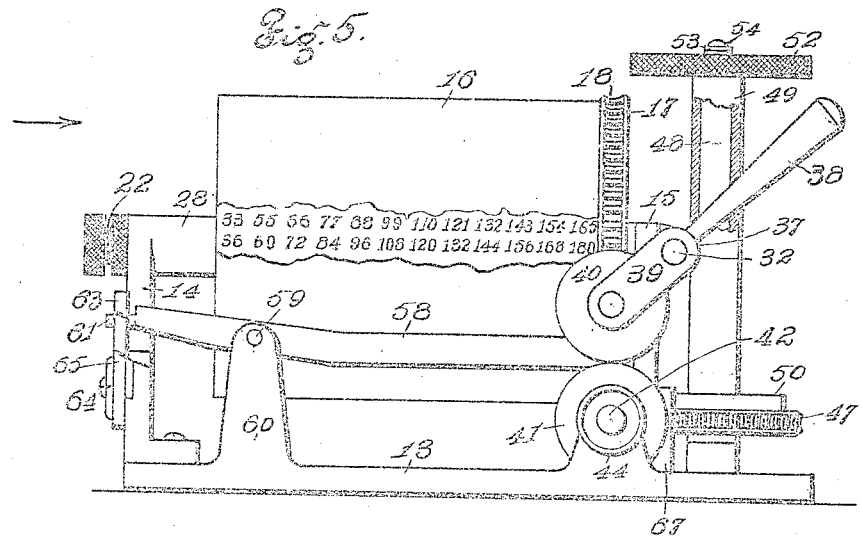
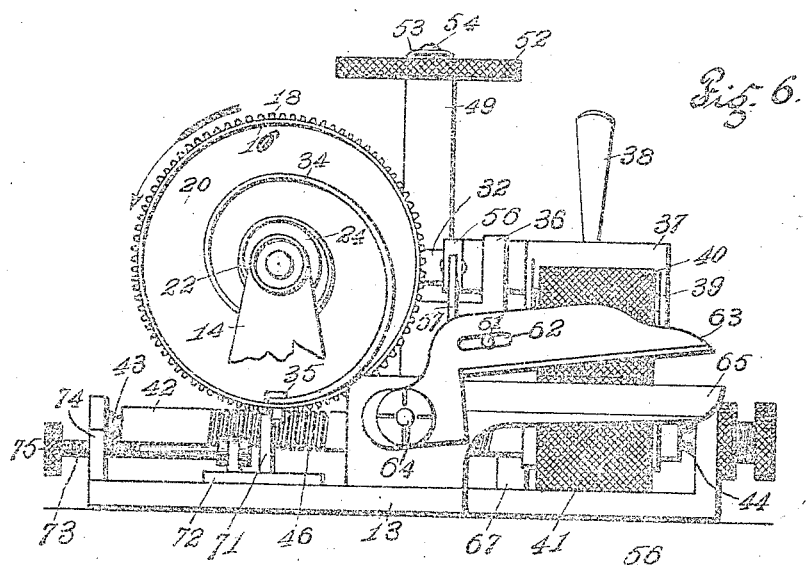
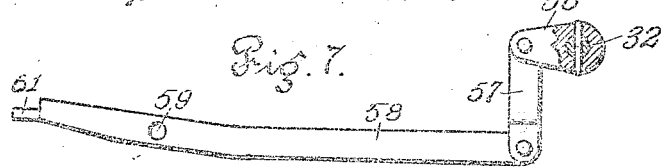
Inventor
Carl Schwartz C. SCHWARTZ.
CLOTH MEASURING AND CUTTING AND COST COMPUTING MACHINE.
APPLICATION FILED JULY 1, 1912.
1,092,802.
Patented Apr. 7, 1914.
4 SHEETS—SHEET 4.
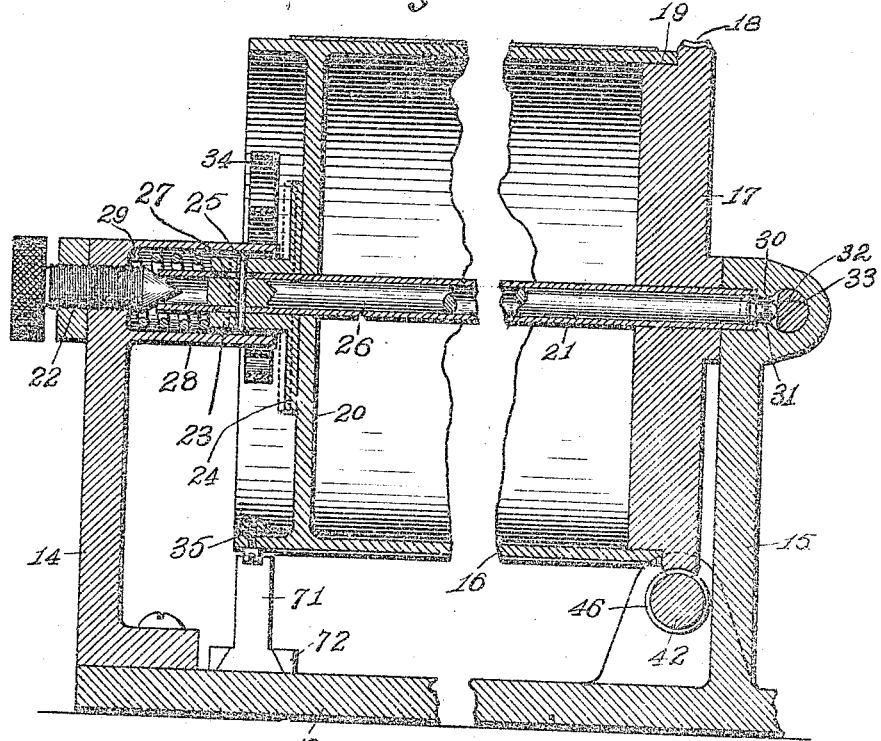
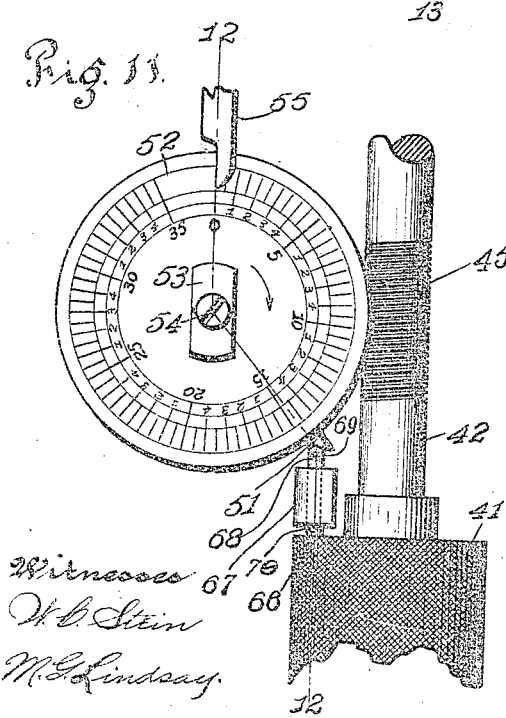
Witnesses
W. C. Stein
M. G. Lindsay
Inventor
Carl Schwartz
by Alfred H. Eecks Atty

UNITED STATES PATENT OFFICE.

CARL SCHWARTZ, OF ST. LOUIS, MISSOURI.

CLOTH MEASURING AND CUTTING AND COST-COMPUTING MACHINE.

1,092,802.   Specification of Letters Patent.   Patented Apr. 7, 1914.

Application filed July 1, 1912. Serial No. 707,127.

*To all whom it may concern:*

Be it known that I, CARL SCHWARTZ, a citizen of the United States, and resident of St. Louis, Missouri, have invented certain new and useful Improvements in Cloth Measuring and Cutting and Cost-Computing Machines, of which the following is a specification.

This invention relates to a novel construction of a combined cloth measuring and cutting, and cost computing machine, in which friction rolls, adapted to be rotated by frictional contact with the cloth drawn between them, in the measuring operation, are so located that the material may be inserted edgewise between them and may be drawn through the same in indefinite lengths to rotate the rolls with only the edge-portion of the goods being engaged by the latter.

The objects of the invention are to provide a setting disk for indicating the length of material to be measured which shall be returned to zero by mechanism actuated from one of the friction rolls; to provide, in combination with the friction rolls and setting disk above referred to, a computing drum which shall also be actuated by the rotation of one of said friction rolls bringing numbers thereon to view indicating the cost at different prices of the material measured coincident with the return of the disk to the zero position; and to provide, in a machine of this type, a cutter which shall be in the path of the material as it is drawn through the machine, and which cutter acts as the starting point for measuring the material so that when the length desired has been passed through the machine and the latter is automatically locked to prevent further movement of the material, the operation of the cutter by the attendant will insure that the material will be cut at the point indicating the exact length of material measured, thus preventing the possibility of the customer receiving more or less than the exact length of material purchased, except by the wilful act of the operator.

Another object of the invention is to provide a means by which the computing drum is to return to its normal position by the operation of the cutting device.

Other objects of the invention relate to improvements in the construction, combination and arrangement of parts, all of which will be more clearly understood from the description and claims to follow.

Figure 1 is a top plan view of my complete invention; Fig. 2 is an end view of the same with a part of the housing broken away showing the position of the friction rollers; Fig. 3 is a top plan view of the mechanism with the housing removed; Fig. 4 is an end view of the same; Fig. 5 is a back view of the same; Fig. 6 is an end view, viewing the same in the direction indicated by the arrow in Fig. 5; Fig. 7 is a detail side view of the cutter operating lever made use of; Fig. 8 is a detail perspective view of a portion of the shaft by which the drum friction mechanism is released; Fig. 9 is a detail perspective view of the locking mechanism used for holding the cloth friction roller in operative position; Fig. 10 is an enlarged detail sectional view of the computing drum and its connection, a part being broken away; Fig. 11 is an enlarged detail top plan view of the setting disk and its rotating mechanism; and Fig. 12 is a vertical sectional view of the same showing the stop mechanism by which the disk is automatically stopped at its normal position and taken on the line 12—12 of Fig. 11.

In carrying out my invention I provide a base plate 13 on which are mounted suitable standards 14 and 15; between these standards is rotatably mounted a computing drum 16; this drum consists of a head 17 having a portion of its periphery formed into a worm gear 18, and a portion of said head is recessed forming a shoulder 19 on which one edge of the drum is attached; the opposite end of the drum is provided with a partition 20, and through the partition and the head 17 extends a tubular shaft 21, one end of said shaft having bearing in the upper portion of the standard 15, and the opposite end receiving the pointed end of an adjusting screw 22; on this tubular shaft is located a collar 23 having an integral friction disk 24 which is adapted to engage the surface of the partition 20. The collar 23 is held in position by means of a pin 25 passing through the collar and an internal shaft 26 located within the tubular shaft, and the said collar is permitted to move laterally with respect to the partition 20 with the shaft 26 by means of the pin 25 traveling in the elongated slots 27 formed in the tubular shaft 21 (for this construction see Fig. 10); the tubular shaft 21 and the collar 23 are housed in a sleeve 28 projecting from the standard 14 and in this sleeve is located a helical spring 29, which engages with the standard 14 and the collar 23; the opposite end of the internal shaft 26 has a projection 30 which extends into a bore 31 formed in the standard 15, said bore acting as a bearing and a support for a rock-shaft 32 actuated by the roller mechanism hereinafter described. That portion of the rock-shaft 32 which projects into the bore is provided with a recess 33 which is adapted to receive the projection 30, (see Fig. 8), and as the shaft 32 is rocked the bottom of the recess acts as a cam to engage the projection 30 and push the shaft 26 inward, thereby releasing the friction disk from engagement with the partition 20 and permitting the drum to return to its normal position or starting point. This latter movement is effected through the agency of a spiral spring 34 located at the end of the computing drum, one end being attached to the sleeve 28 and the opposite end to the drum at the point indicated by the numeral 35 (see Figs. 6 and 10).

The rock-shaft 32 previously described is also supported in a bracket 36 and on the opposite end of the said shaft is mounted a bifurcated lever 37 provided with an operating handle 38, and between the arms 39 of said lever is axially mounted a friction roller 40; this roller is designed to coöperate with a corresponding roller 41 which is mounted upon a shaft 42 supported between a stationary pivot bearing 43 and an adjustable pivot bearing 44; a portion of this shaft is provided with a fine thread worm 45 and another portion with a coarse thread worm 46; the fine thread worm meshing with a worm gear 47 while the coarse thread worm meshes with the worm 18 on the drum head 17. The worm gear 47 is loosely mounted on a post 48 which is supported on the bed plate, and on said post is located a sleeve 49, its bottom portion terminating in a disk 50, provided with a projection or stop 51. The upper end of the sleeve 49 has a setting disk 52 on which are indicated yards and fractions thereof in lineal measure. This mechanism as described is held in frictional contact with the worm gear 47 by means of the spring 53 held in position by the screw 54; by this arrangement the setting disk, its sleeve and the disk 50 can be manipulated so as to set the indication on the disk in registry with the pointer 55 without in any manner interfering with the worm gear 47.

On the rock-shaft 32 is secured a short arm 56 to which is connected a link 57 and said link is attached to a cutter operating lever 58; this lever is pivoted at the point indicated by the numeral 59, to a lug 60 projecting from the base plate; the end 61 of the lever projects into an elongated slot 62 formed in the moving cutter blade 63 pivoted at the point indicated by the numeral 64 to the stationary cutter blade 65, which is rigidly attached to the base plate.

On one end of the roller 41 is located a stop 66, and on the base plate is a projection 67, which is provided with a sliding pin 68 controlled by a spring 69, this mechanism being for the purpose of automatically locking the roller and the setting disk when the said setting disk has reached its normal position or when zero is in registry with the pointer 55. The pin 68 is normally held out of contact with the stop 66, but its end 70 is forced outward into the path of said stop when the pin is engaged by the projection 51 on the disk 50.

On the base plate is located an adjustable stop block 71, which is mounted between dove-tail guides 72 and is actuated by a screw 73 operating in a lug 74 and having a milled head 75. The object of this is to regulate the reverse movement of the drum so that on its return to its normal position the initial line of figures will be in registry with the opening or elongated slot 76 formed in the housing or cover 77 which incases the mechanism.

On the housing and immediately above the elongated slot 76 are imprinted numbers indicating different prices ranging from three cents up; the prices may be arranged in even amounts or in fractions as found desirable. In Fig. 1 the numbers shown on the drum indicate the cost of ten yards at the various prices indicated, while in Fig. 3. the upper row indicates the price of one yard, and the lower the cost of thirty-five yards. On the setting disk or dial are imprinted the yards and fractions thereof in lineal measure, and when said disk is set it travels in the direction indicated by the arrow (see Fig. 11).

On the rock-shaft 32 is mounted a locking cam 78, its end 79 being adapted to engage a locking spring 80 attached to the standard 15 whereby to hold the roller 40 in a locked raised position when manipulated by the handle 38. This locking is effected solely by frictional engagement of the cam with the spring, so that by the manipulation of the handle 38 the roller can be readily lowered from its locked elevated position.

The operation of my invention is as follows: The setting disk is first manipulated by bringing a numeral on said disk in registry with the pointer 55, this said number designating the number of yards or fraction thereof to be measured. When this has been done the bifurcated lever 37 together with the roller 40 is elevated which operation also simultaneously closes the cutting blades. The cloth is then inserted between the rollers 40 and 41, its end brought in contact with the cutting blade, which also serves as the point from which the material is measured, and the upper roller lowered and brought in contact with the cloth. This operation simultaneously opens the cutter blades, and sets the friction mechanism which controls the movement of the computing drum. The cloth is then pulled through the machine, the computing drum rotating in the direction indicated by the arrow in Fig. 6, and the setting disk simultaneously rotating in the direction indicated by the arrow in Fig. 11. When the zero on the setting disk comes in registry with the pointer 55 as shown, further movement is prevented by reason of the projection 51 engaging the pin 68 which in turn engages with the stop 66. At this point the cost of the yards or fraction thereof measured can be observed through the elongated opening 76 of the housing. The handle 38 together with its roller is then operated releasing the roller from contact with the cloth, at the same time operating the cutter blades which will slit the cloth at the proper length measured. For example, if ten yards of cloth are to be measured by the machine, the said disk or dial is turned to bring the numeral 10 of the dial in registry with the pointer 55, and by setting the machine and pulling the cloth between the two rollers as previously described the drum will rotate simultaneously with the setting disk until zero is brought into registry with the pointer; the cost of this ten yards will then be indicated through the elongated opening in the housing. The price of the material being fifteen cents per yard, one and fifty one-hundredths ($1.50) dollars will be indicated in the space opposite the price number "15" on the casing (see Fig. 1). In order to repeat this movement the roller 40 is raised by the manipulation of the handle 38; by so doing the shaft 32 is rotated, its cam 33 engages the projection 30 of the shaft 26 thereby releasing the frictional contact of the disk 24 with the drum, and the said drum will rotate to its normal position by the action of the spiral spring 34, and will be stopped at its starting point by means of the stop block 71 coming in contact with the projection on the drum.

It will be noted that the friction rolls 40 and 41 are located to one side of the machine, or in the clear. This feature of the invention enables me to insert the material edgewise between the rolls, and presents an uninterrupted path for the passage of the material between the rolls, so that only the edge-portion of the material need be utilized in the measuring operation. In the commercial form of my machine the friction rollers do not exceed two inches in length; the whole machine is about half the size and weight of an ordinary typewriter, and is so light and compact that it may be readily lifted and carried about.

I claim:

1. In a machine of the class described, a rotatable setting disk for indicating the length of material to be measured, a pair of separable friction rolls located in the clear to permit the insertion edgewise therebetween of the material and to present an uninterrupted path for the passage of the material in a right line in indefinite lengths between the rolls to thereby rotate the same, and means operatively associated with one of said rolls and actuated thereby in its rotation to rotate the setting disk and return it to zero.

2. In a machine of the class described, a rotatable setting disk for indicating the length of material to be measured, a pair of separable friction rolls located in the clear to permit the insertion edgewise therebetween of the material and to present an uninterrupted path for the passage of the material in a right line in indefinite lengths between the rolls to thereby rotate the same, means operatively associated with one of said rolls and actuated thereby in its rotation to rotate the setting disk and return it to zero, and means for stopping said setting disk at zero.

3. In a machine of the class described, a setting disk for indicating the length of material to be measured, a pair of separable friction rolls located in the clear to permit the insertion edgewise therebetween of the material and to present an uninterrupted path for the passage of the material in a right line in indefinite lengths between the rolls to thereby rotate the same, means operatively associated with one of said rolls and actuated thereby in its rotation to return the setting disk to zero, a cutter located at a distance from, and substantially in the horizontal plane of said roll and serving as the point from which the material is to be measured, and means to simultaneously separate the rolls and actuate the said cutter.

4. In a machine of the class described, a setting disk for indicating the length of material to be measured, a computing drum, a friction roll over which the material to be measured is drawn to thereby rotate said roll, movable means for maintaining the material in frictional contact with said roll during such movement, and means operatively associated with said roll and actuated thereby in its rotation to return the setting disk to zero and the computing drum to a position to indicate the cost of the material measured.

5. In a machine of the class described, a setting disk for indicating the length of material to be measured, a computing drum, a friction roll over which the material to be measured is drawn to thereby rotate said roll, movable means for maintaining the material in frictional contact with said roll during such movement, said means and roll being located in the clear to permit the insertion edgewise therebetween of the material and to present an uninterrupted path for the passage of the material in a right line in indefinite lengths over the roll, and means operatively associated with said roll and actuated thereby in its rotation to return the setting disk to zero and the computing drum to a position to indicate the cost of the material measured.

6. In a machine of the class described, a setting disk for indicating the length of material to be measured, a computing drum, a friction roll over which the material to be measured is drawn to thereby rotate said roll, movable means for maintaining the material in frictional contact with said roll during such movement, means operatively associated with said roll and actuated thereby in its rotation to return the disk to zero and the computing drum to a position to indicate the cost of the material measured, and means for returning the computing drum to its initial position.

7. In a machine of the class described, a setting disk for indicating the length of material to be measured, a computing drum, a friction roll over which the material to be measured is drawn to thereby rotate said roll, movable means for maintaining the material in frictional contact with said roll during such movement, means operatively associated with said roll and actuated thereby in its rotation to return the disk to zero and the computing drum to a position to indicate the cost of the material measured, and means for automatically returning the computing drum to its initial position.

In testimony whereof, I have signed my name to this specification, in presence of two subscribing witnesses.

CARL SCHWARTZ.

Witnesses:
 ALFRED A. EICKS,
 FRITZ DIPPON.